US011785297B2

(12) United States Patent
Jain et al.

(10) Patent No.: US 11,785,297 B2
(45) Date of Patent: Oct. 10, 2023

(54) SYSTEMS AND METHODS FOR DETECTING IMPROPER IMPLEMENTATION OF PRESENTATION OF CONTENT ITEMS BY APPLICATIONS EXECUTING ON CLIENT DEVICES

(71) Applicant: GOOGLE LLC, Mountain View, CA (US)

(72) Inventors: Priyanshu Jain, Mountain View, CA (US); Tuna Toksoz, Mountain View, CA (US); Spencer S. Johnson, Mountain View, CA (US); Alex Jacobson, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/750,853

(22) Filed: May 23, 2022

(65) Prior Publication Data
US 2022/0286743 A1    Sep. 8, 2022

Related U.S. Application Data

(63) Continuation of application No. 16/901,627, filed on Jun. 15, 2020, now Pat. No. 11,350,165, which is a
(Continued)

(51) Int. Cl.
*H04N 21/45* (2011.01)
*H04N 21/454* (2011.01)
(Continued)

(52) U.S. Cl.
CPC ........ *H04N 21/454* (2013.01); *G06F 16/338* (2019.01); *H04N 21/4825* (2013.01); *H04N 21/4882* (2013.01)

(58) Field of Classification Search
CPC ............ H04N 21/454; H04N 21/4825; H04N 21/4882; G06F 16/338
See application file for complete search history.

(56) References Cited

U.S. PATENT DOCUMENTS 5,900,905 A    5/1999  Shoff
6,460,180 B1   10/2002 Park
(Continued)

FOREIGN PATENT DOCUMENTS

JP    2013-134770 A    7/2013
JP    2016-006675 A    1/2016
(Continued)

OTHER PUBLICATIONS

International Preliminary Report on Patentability on Appln. Ser. No. PCT/US2017/020735 dated Sep. 12, 2019 (7 pages).
(Continued)

*Primary Examiner* — Timothy R Newlin
(74) *Attorney, Agent, or Firm* — MARSHALL, GERSTEIN & BORUN LLP

(57) ABSTRACT

Systems and methods for detecting improper presentation of content items by applications executing on client devices. A method can include receiving a content package including a first content item, a second content item and an interaction confirmation script, the interaction confirmation script configured to execute within an application and cause the application to detect, responsive to the first content item presented, a first interaction event with the first content item; present, upon detecting the first interaction event on the first content item, the second content item; detect a second interaction event with the second content item; transmit, upon detecting the second interaction event, a confirmation of the first interaction event; and transmit a request to access an information resource linked to the second content item. The method can further include presenting the information
(Continued)

resource responsive to the second interaction event on the second content item.

20 Claims, 6 Drawing Sheets

Related U.S. Application Data continuation of application No. 16/084,915, filed as application No. PCT/US2017/065828 on Dec. 12, 2017, now Pat. No. 10,687,111, which is a continuation of application No. PCT/US2017/020735, filed on Mar. 3, 2017.

(51) Int. Cl.
*G06F 16/338*  (2019.01)
*H04N 21/482*  (2011.01)
*H04N 21/488*  (2011.01)

(56) References Cited

U.S. PATENT DOCUMENTS

| | | | |
|---|---|---|---|
| 6,522,342 B1 * | 2/2003 | Gagnon | H04N 21/4143 715/833 |
| 6,557,171 B1 * | 4/2003 | Sonoda | H04N 21/2362 725/138 |
| 6,891,561 B1 * | 5/2005 | Achituv | H04N 5/2624 348/42 |
| 8,723,986 B1 * | 5/2014 | Merrill, Jr. | H04M 1/72403 348/207.99 |
| 9,591,050 B1 * | 3/2017 | Sherrets | H04N 21/8153 |
| 9,681,165 B1 | 6/2017 | Gupta | |
| 10,037,310 B1 * | 7/2018 | Marra | G06Q 30/02 |
| 10,687,111 B2 | 6/2020 | Jain et al. | |
| 10,915,929 B1 * | 2/2021 | Huang | H04N 21/4758 |
| 2002/0018138 A1 | 2/2002 | Yoshiro | |
| 2002/0065912 A1 * | 5/2002 | Catchpole | H04L 9/40 713/168 |
| 2002/0126142 A1 * | 9/2002 | Hodgkinson | H04N 5/445 348/E5.111 |
| 2002/0129366 A1 * | 9/2002 | Schein | H04N 21/84 725/51 |
| 2002/0156815 A1 * | 10/2002 | Davia | G06F 16/958 707/E17.116 |
| 2002/0198878 A1 * | 12/2002 | Baxter | G06F 40/131 |
| 2003/0229900 A1 | 12/2003 | Reisman | |
| 2005/0166228 A1 * | 7/2005 | Takatori | H04N 21/254 725/38 |
| 2005/0182928 A1 | 8/2005 | Kamalanathan et al. | |
| 2005/0246759 A1 * | 11/2005 | Yoshida | H04N 21/4532 725/138 |
| 2005/0289145 A1 | 12/2005 | Voegel | |
| 2006/0129894 A1 * | 6/2006 | Marubashi | G06F 11/3688 714/38.1 |
| 2006/0136294 A1 | 6/2006 | Linden et al. | |
| 2006/0170963 A1 * | 8/2006 | Aoki | H04L 51/214 358/1.15 |
| 2006/0181510 A1 * | 8/2006 | Faith | G06F 3/0317 345/158 |
| 2006/0279584 A1 * | 12/2006 | Matsuoka | H04N 21/4143 345/661 |
| 2008/0155607 A1 * | 6/2008 | Klappert | H04N 21/435 725/62 |
| 2008/0165202 A1 | 7/2008 | Brodersen | |
| 2009/0007001 A1 * | 1/2009 | Morin | G06F 3/0237 715/773 |
| 2009/0007198 A1 | 1/2009 | Lavender | |
| 2009/0178089 A1 * | 7/2009 | Picco | G11B 27/10 725/100 |
| 2009/0217145 A1 * | 8/2009 | Watson | G06F 16/9577 715/202 |
| 2010/0058376 A1 * | 3/2010 | Alhadeff | H04N 21/44204 725/23 |
| 2010/0149589 A1 | 6/2010 | Hayashi | |
| 2010/0269093 A1 * | 10/2010 | Walsh | G06F 8/34 717/107 |
| 2010/0280953 A1 | 11/2010 | Kitazato | |
| 2010/0324992 A1 * | 12/2010 | Birch | H04N 21/4722 725/32 |
| 2011/0018802 A1 * | 1/2011 | Sung | H04N 21/42224 345/158 |
| 2011/0063508 A1 | 3/2011 | Nishimura | |
| 2011/0191811 A1 | 8/2011 | Rouse | |
| 2011/0231819 A1 * | 9/2011 | Tanner | G06Q 30/02 717/123 |
| 2012/0056730 A1 * | 3/2012 | Ujiie | H04N 21/42224 340/12.22 |
| 2013/0065569 A1 * | 3/2013 | Leipzig | H04W 4/16 455/420 |
| 2013/0124299 A1 | 5/2013 | Montgomery et al. | |
| 2013/0321648 A1 | 12/2013 | Tamiya | |
| 2014/0033199 A1 | 1/2014 | Falodiya | |
| 2014/0130102 A1 * | 5/2014 | Iijima | H04N 21/84 725/53 |
| 2014/0320436 A1 * | 10/2014 | Modarres | G06F 1/1652 345/173 |
| 2014/0331133 A1 * | 11/2014 | Coburn, IV | G11B 27/102 715/716 |
| 2015/0074513 A1 * | 3/2015 | Liang | G06F 16/9577 715/234 |
| 2015/0172487 A1 | 6/2015 | Kirihara | |
| 2015/0208013 A1 * | 7/2015 | Friedrich | H04N 21/42222 348/734 |
| 2016/0012023 A1 * | 1/2016 | Benjamin | G06F 40/186 715/235 |
| 2016/0055306 A1 * | 2/2016 | Ozeki | H04L 51/216 705/2 |
| 2016/0066049 A1 * | 3/2016 | Mountain | H04N 21/4622 725/58 |
| 2016/0112769 A1 * | 4/2016 | Adam | H04N 21/435 725/38 |
| 2016/0162779 A1 * | 6/2016 | Marcus | G06N 20/10 706/12 |
| 2016/0171014 A1 | 6/2016 | Lam | |
| 2016/0261818 A1 | 9/2016 | Du | |
| 2017/0116987 A1 | 4/2017 | Kang | |
| 2017/0223407 A1 | 8/2017 | Yoshizawa | |
| 2017/0324877 A1 | 11/2017 | Tokuchi | |
| 2017/0329419 A1 * | 11/2017 | Dearman | G06F 3/0346 |
| 2018/0007229 A1 * | 1/2018 | Adachi | H04N 1/32122 |
| 2018/0039530 A1 * | 2/2018 | Ciabarra, Jr. | G06F 11/0709 |
| 2018/0063589 A1 | 3/2018 | Chand | |
| 2018/0089011 A1 * | 3/2018 | Basiri | G06F 9/5077 |
| 2018/0107641 A1 * | 4/2018 | Choi | G06Q 30/0276 |
| 2018/0108069 A1 * | 4/2018 | Zedell | G06F 16/9577 |
| 2018/0191798 A1 * | 7/2018 | Zhu | H04L 67/75 |
| 2018/0255080 A1 * | 9/2018 | Paine | G06F 21/554 |
| 2019/0208233 A1 * | 7/2019 | Gratton | H04N 21/47217 |
| 2019/0295123 A1 * | 9/2019 | Magnuson-Skeels | G06F 16/9535 |
| 2020/0129366 A1 | 4/2020 | Huang et al. | |
| 2020/0314492 A1 | 10/2020 | Jain et al. | |
| 2021/0117825 A1 * | 4/2021 | Dickey | G06F 16/9535 |
| 2021/0297739 A1 * | 9/2021 | Manus | H04N 21/2407 |

FOREIGN PATENT DOCUMENTS

| | | |
|---|---|---|
| JP | 2016-031667 A | 3/2016 |
| JP | 2016-081199 A | 5/2016 |
| WO | WO-2013/192379 A1 | 12/2013 |
| WO | WO-2016/030950 A1 | 3/2016 |

OTHER PUBLICATIONS

International Preliminary Report on Patentability on Appln. Ser. No. PCT/US2017/065828 dated Sep. 12, 2019 (7 pages).
International Search Report and Written Opinion on Appln. Ser. No. PCT/US2017/020735 dated Aug. 22, 2017 (12 pages).

(56) References Cited

OTHER PUBLICATIONS

International Search Report and Written Opinion on Appln. Ser. No. PCT/US2017/065828 dated Feb. 7, 2018 (12 pages).
Examination Report for Application No. GB1800964.7, dated Oct. 18, 2021.
First Office Action for CN Appln. Ser. No. 201780002022.3 dated May 13, 2021 (15 pages).
Examination Report for IN Appln. Ser. No. 201927013694 dated Mar. 23, 2021 (8 pages).
Examination Report for EP Appln. Ser. No. 17818717.5 dated Feb. 15, 2021 (8 pages).
Office Action for KR Appln. Ser. No. 10-2019-7012710 dated Jul. 17, 2020 (6 pages).
Non-Final Office Action for U.S. Appl. No. 16/084,915 dated Oct. 31, 2019 (11 pages).
Notice of Allowance for U.S. Appl. No. 16/084,915 dated Feb. 7, 2020 (7 pages).
Notice of Reasons for Rejection for JP 2019-519728 dated Jul. 6, 2020 (5 pages).

\* cited by examiner

SYSTEMS AND METHODS FOR DETECTING IMPROPER IMPLEMENTATION OF PRESENTATION OF CONTENT ITEMS BY APPLICATIONS EXECUTING ON CLIENT DEVICES

CROSS-REFERENCE RELATED APPLICATIONS

The present application is a continuation of U.S. patent application Ser. No. 16/901,627, filed Jun. 15, 2020, and entitled "Systems and Methods for Detecting Improper Implementation of Presentation of Content Items by Applications Executing on Client Devices", which is a continuation of U.S. patent application Ser. No. 16/084,915, filed Sep. 13, 2018, and entitled "Systems and Methods for Detecting Improper Implementation of Presentation of Content Items by Applications Executing on Client Devices", which itself is a National Stage Application, filed under 35 U.S.C. 371, of International Patent Application No. PCT/US2017/065828 filed on Dec. 12, 2017, titled "Systems and Methods for Detecting Improper Implementation of Presentation of Content Items by Applications Executing on Client Devices," which in turn claims the benefit of and priority to P.C.T. Application No. PCT/US2017/020735, entitled "Systems and Methods for Detecting Improper Implementation of Presentation of Content Items by Applications Executing on Client Devices," filed Mar. 3, 2017, the entirety of which is incorporated by reference herein.

BACKGROUND

In a computer networked environment such as the internet, data from a server can be delivered to a client device responsive to a request for content. The client device receives the data from the server. The data can include instructions for rendering content corresponding to the data for display at the client device. Content publishers can dictate the instructions corresponding to presentation parameters of a content item (e.g., a native content item).

SUMMARY

At least one aspect is directed to a method for detecting improper presentation of content items by applications executing on client devices. The method can detect inadvertent interactions with native content items in applications executing on client devices occurring due to the improper presentation of the content items by the applications. The method can include receiving, by a data processing system including one or more processors, content requests from a plurality of client devices, wherein each of the content requests is generated by an application executing on a respective client device of the plurality of client devices; transmitting, by the data processing system, to each client device of a first subset of the plurality of client devices, responsive to a content request from the client device, a content package including at least a content item and an interaction confirmation script; transmitting, by the data processing system, to each client device of a second subset of the plurality of client devices, responsive to a content request from the client device, the content item; determining, by the data processing system, a first performance metric of the content package; determining, by the data processing system, a second performance metric of the content item; and determining, by the data processing system, whether the application receives inadvertent clicks at the content item based on at least one of the first performance metric or the second performance metric.

In some implementations, determining the first performance metric is based on confirmations received from the first subset of the plurality of client devices; and determining the second performance metric is based on confirmations received from the second subset of the plurality of client devices. In some implementations, the first performance metric includes a ratio representing a number of confirmations received from the first subset of the plurality of client devices compared to a number of client devices in the first subset of the plurality of client devices. In some implementations, the second performance metric includes a ratio representing a number of confirmations received from the second subset of the plurality of client devices compared to a number of client devices in the second subset of the plurality of client devices. In some implementations, the application receives inadvertent clicks at the content item and the method further comprises: adding, based on the comparison, an application identifier of the application to a content restriction list to restrict selection of the content item for transmission responsive to a subsequent content request identifying the application.

In some implementations, the application identifier is associated with a predetermined percentage and the predetermined percentage identifies a percentage of content requests that are to be classified as script requests for sending the interaction confirmation script. In some implementations, determining whether the application receives inadvertent clicks at the content item includes comparing the first performance metric to the second performance metric. In some implementations, determining whether the application receives inadvertent clicks further includes: when a difference between the first performance metric and the second performance metric is above a predetermined threshold, determining that the application receives inadvertent clicks at the content item, the difference based on the comparing.

At least one aspect is directed to a system for detecting improper presentation of content items by applications executing on client devices. The system can detect inadvertent interactions with native content items in applications executing on client devices occurring due to the improper presentation of the content items by the applications. The system can include a processor and a memory coupled to the processor. The memory can store computer-executable instructions, which when executed by the processor, cause the processor to receive content requests from a plurality of client devices, wherein each of the content requests is generated by an application executing on a respective client device of the plurality of client devices; transmit, to each client device of a first subset of the plurality of client devices, responsive to a content request from the client device, a content package including at least a content item and an interaction confirmation script; transmit, to each client device of a second subset of the plurality of client devices, responsive to a content request from the client device, the content item; determine a first performance metric of the content package; determine a second performance metric of the content item; and determine whether the application receives inadvertent clicks at the content item based on at least one of the first performance metric or the second performance metric.

In some implementations, determining the first performance metric is based on confirmations received from the first subset of the plurality of client devices; and determining the second performance metric is based on confirmations received from the second subset of the plurality of client devices. In some implementations, the first performance metric includes a ratio representing a number of confirmations received from the first subset of the plurality of client devices compared to a number of client devices in the first subset of the plurality of client devices. In some implementations, the second performance metric includes a ratio representing a number of confirmations received from the second subset of the plurality of client devices compared to a number of client devices in the second subset of the plurality of client devices. In some implementations, the application receives inadvertent clicks at the content item and wherein the memory stores further computer-executable instructions that, when executed by the processor, cause the processor to: add, based on the comparison, an application identifier of the application to a content restriction list to restrict selection of the content item for transmission responsive to a subsequent content request identifying the application.

In some implementations, the application identifier is associated with a predetermined percentage and the predetermined percentage identifies a percentage of content requests that are to be classified as script requests for sending the interaction confirmation script. In some implementations, determining whether the application receives inadvertent clicks at the content item includes comparing the first performance metric to the second performance metric. In some implementations determining whether the application receives inadvertent clicks at the content item further includes: when a difference, based on the comparing, between the first performance metric and the second performance metric is above a predetermined threshold, determining that the application receives inadvertent clicks at the content item.

At least one aspect is directed to a method for detecting improper presentation of content items in applications executing on client devices. The method can detect inadvertent interactions with native content items in the applications executing on the client devices occurring due to the improper presentation of the content items by the applications. The method includes receiving, by a data processing system including one or more processors, content requests from a plurality of client devices, wherein each of the content requests is generated by an application executing on a respective client device of the plurality of client devices; transmitting, by the data processing system, to each client device of a subset of the plurality of client devices, responsive to a content request from the client device, a content package including at least a first content item, a second content item, and an interaction confirmation script, the interaction confirmation script configured to cause the application to: configure the first content item to be presented in a first presentation format, present the first content item in the first presentation format, display the second content item responsive to detecting a first interaction event on the first content item, and transmit, to the data processing system, a confirmation responsive to detecting a second interaction event on the second content item; determining, by the data processing system, a performance metric of the content package; and determining, by the data processing system, whether the application receives inadvertent clicks at the first content item based on at least the performance metric.

In some implementations, determining the performance metric is based on confirmations received from the subset of the plurality of client devices. In some implementations, determining whether the application receives inadvertent clicks at the first content item includes comparing the performance metric to a predetermined threshold value. In some implementations, the application receives inadvertent clicks at the first content item, and the method further comprises: adding, based on the comparison, an application identifier of the application to a content restriction list to restrict selection of the first content item for transmission responsive to a subsequent content request identifying the application These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. It will be appreciated that aspects and implementations can be combined and features described in the context of one aspect or implementation can be implemented in the context of other aspects.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
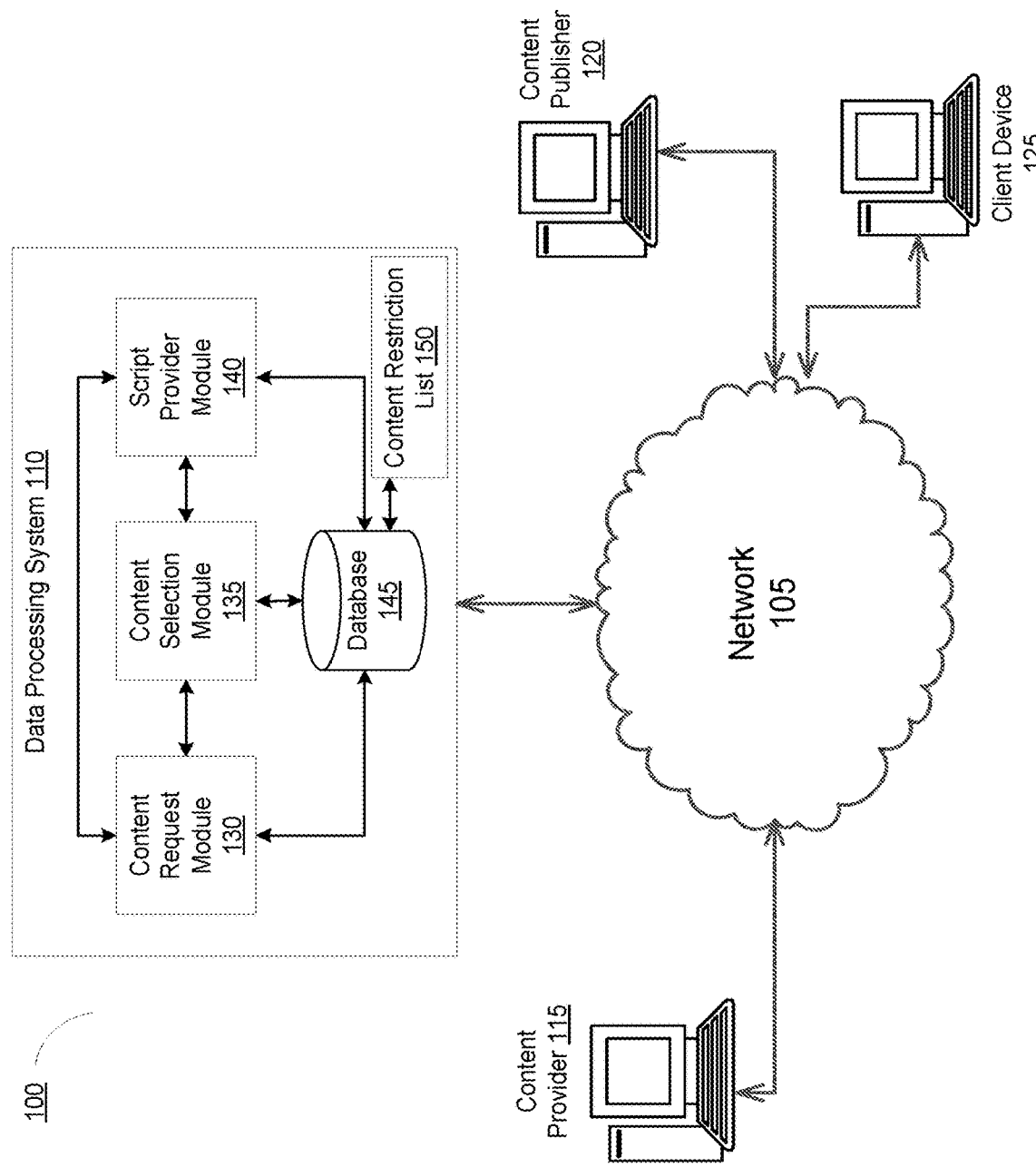
FIG. 1 is a block diagram depicting an environment for detecting improper presentation of content items by applications executing on client devices according to some implementations.

Following below are more detailed descriptions of various concepts related to, and implementations of, methods, apparatuses, and systems for detecting improper presentation of content items by applications executing on client devices. The various concepts introduced above and discussed in greater detail below may be implemented in any of numerous ways, as the described concepts are not limited to any particular manner of implementation.

The present disclosure relates to systems and methods for detecting improper presentation of content items by applications executing client devices. In particular, the present disclosure relates to systems and methods for detecting false interactions with content items in an application executing on a mobile computing device.

Within a mobile application, dynamically loaded content items, such as images, videos, or other displayable content, may be embedded inside the look and feel of the application in a native format or an interstitial format. In the native format, content item publishers are free to customize characteristics of the content items, such as fonts, colors, location of content item components, or other details of the content items, independently of the mobile application in which the content items are eventually displayed. In the interstitial format, content items are typically displayed at natural transition points or logical breaks in the flow of an application and may overlay the application's regular user interface (e.g., an interstitial content item may be displayed in full-screen).

For content items in the native format, typically, serving a native content item entails providing individual components of a content item (e.g., title, image, description, etc.) that a content publisher is free to implement or display as the content publisher sees fit. However, the publisher, will often display the native content item improperly, resulting in a bad user experience caused by inadvertent user interactions. For example, consider a "swipe to unlock" functionality that enables a mobile device to be unlocked by swiping across a locked screen of the mobile device. On the locked screen, the mobile device may also display a content item that is also activated by swiping. The content item may be incorrectly displayed over or very close to the "swipe to unlock" area. As such, when a user swipes to unlock the mobile device, the swipe may not only be recognized as the swipe to unlock, but may additionally (and incorrectly) be recognized as an interaction with the content item, resulting in the mobile device performing unwanted operations, such as opening a link in a browser associated with the inadvertently swiped content item.

There are technical problems with respect to incorrectly presented content items within an application of a client device (e.g., content items that are improperly rendered within an application). For example, causing a client device to execute the computer-executable instructions to process an inadvertent click of an incorrectly displayed or presented content item can result in increased battery consumption, waste of network resources in providing data associated with the inadvertently clicked content item, and additional computing resources that may adversely affect the performance of the client device. Furthermore, inadvertent interactions with content items can result in a poor user experience.

FIG. 1 is a block diagram depicting an environment for detecting improper presentation of content items by applications executing on client devices according to some implementations. The environment 100 includes at least one data processing system 110. The data processing system 110 can include at least one processor (or a processing circuit) and a memory. The memory stores processor-executable instructions that, when executed on the processor, cause the processor to perform one or more of the operations described herein. The processor can include a microprocessor, application-specific integrated circuit (ASIC), field-programmable gate array (FPGA), etc., or combinations thereof. The memory can include, but is not limited to, electronic, optical, magnetic, or any other storage or transmission device capable of providing the processor with program instructions. The memory can further include a floppy disk, CD-ROM, DVD, magnetic disk, memory chip, ASIC, FPGA, read-only memory (ROM), random-access memory (RAM), electrically-erasable ROM (EEPROM), erasable-programmable ROM (EPROM), flash memory, optical media, or any other suitable memory from which the processor can read instructions. The instructions can include code from any suitable computer-programming language. The data processing system 110 can include one or more computing devices or servers that can perform various functions.

The network 105 can include computer networks such as the internet, local, wide, metro or other area networks, intranets, satellite networks, other computer networks such as voice or data mobile phone communication networks, and combinations thereof. The data processing system 110 of the environment 100 can communicate via the network 105, for instance with at least one content provider computing device 115, at least one content publisher computing device 120, or at least one client device 125. The network 105 may be any form of computer network that relays information between the client device 125, data processing system 110, and one or more content sources, for example, web servers, content servers, amongst others. For example, the network 105 may include the Internet and/or other types of data networks, such as a local area network (LAN), a wide area network (WAN), a cellular network, satellite network, or other types of data networks. The network 105 can also include any number of computing devices (e.g., computer, servers, routers, network switches, etc.) that are configured to receive and/or transmit data within network 105. The network 105 can further include any number of hardwired and/or wireless connections. For example, the client device 125 can communicate wirelessly (e.g., via WiFi, cellular, radio, etc.) with a transceiver that is hardwired (e.g., via a fiber optic cable, a CAT5 cable, etc.) to other computing devices in network 105.

The content provider computing device 115 can include servers or other computing devices operated by a content provider entity to provide one or more content items for display on information resources at the client device 125. The content provided by the content provider computing device 115 can include third-party content items for display on information resources, such as a website or web page that includes primary content, e.g., content provided by the content publisher computing device 120. The content items can also be displayed on a search results web page. For instance, the content provider computing device 115 can provide or be the source of one or more content items for display in content slots of content web pages, such as a web page of a company where the primary content of the web page is provided by the company, or for display on a search results landing page provided by a search engine. The content items associated with the content provider computing device 115 can be displayed on information resources other than web pages, such as content displayed as part of the execution of an application (such as a global positioning system (GPS) or map application, or other types of applications) on a smartphone or other client device 125.

The content publisher computing device 120 can include servers or other computing devices operated by a content publishing entity to provide primary content for display via the network 105. For instance, the content publisher computing device 120 can include a web page operator who provides primary content for display on the web page. The primary content can include content other than that provided by the content publisher computing device 120, and the web page can include content slots configured for the display of third party content items from the content provider computing device 115. For instance, the content publisher computing device 120 can operate the website of a company and can provide content about that company for display on web pages of the website. The web pages can include content slots configured for the display of third-party content items of the content provider computing device 115. In some implementations, the content publisher computing device 120 includes a search engine computing device (e.g. server) of a search engine operator that operates a search engine website. The primary content of search engine web pages (e.g., a results or landing web page) can include results of a search as well as third party content items displayed in content slots such as content items from the content provider computing device 115. In some implementations, the content publisher computing device 120 can include a server for serving video content.

The client device 125 can include computing devices configured to communicate via the network 105 to display data such as the content provided by the content publisher computing device 120 (e.g., primary web page content or other information resources) and the content provided by the content provider computing device 115 (e.g., third party content items configured for display in a content slot of a web page or application). For example, the client device 125 can be configured to run an application created or published by the content publisher computing device 120, and the application can be configured to display content items (e.g., native content items) therein. The client device 125, the content provider computing device 115, and the content publisher computing device 120 can include desktop computers, laptop computers, tablet computers, smartphones, personal digital assistants, mobile devices, consumer computing devices, servers, clients, digital video recorders, a set-top box for a television, a video game console, or any other computing device configured to communicate via the network 105. The client device 125 can be communication devices through which an end-user can submit requests to receive content. The requests can be requests to a search engine and the requests can include search queries. In some implementations, the requests can include a request to access a web page.

The content provider computing device 115, the content publisher computing device 120 and the client device 125 can include a processor and a memory, i.e., a processing circuit. The memory stores machine instructions that, when executed on the processor, cause the processor to perform one or more of the operations described herein. The processor can include a microprocessor, application-specific integrated circuit (ASIC), field-programmable gate array (FPGA), etc., or combinations thereof. The memory can include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically-erasable ROM (EEPROM), erasable-programmable ROM (EPROM), flash memory, optical media, or any other suitable memory from which the processor can read instructions. The instructions can include code from any suitable computer-programming language.

The content provider computing device 115, the content publisher computing device 120, and the client device 125 can also include one or more user interface devices. In general, a user interface device refers to any electronic device that conveys data to a user by generating sensory information (e.g., a visualization on a display, one or more sounds, etc.) and/or converts received sensory information from a user into electronic signals (e.g., a keyboard, a mouse, a pointing device, a touch screen display, a microphone, etc.). The one or more user interface devices can be internal to a housing of the content provider computing device 115, the content publisher computing device 120 and the client device 125 (e.g., a built-in display, microphone, etc.) or external to the housing of content provider computing device 115, the content publisher computing device 120 and the client device 125 (e.g., a monitor connected to the user computing device 115, a speaker connected to the user computing device 115, etc.), according to various implementations. For example, the content provider computing device 115, the content publisher computing device 120 and the client device 125 can include an electronic display, which visually displays web pages using webpage data received from one or more content sources and/or from the data processing system 110 via the network 105. In some implementations, a content placement campaign manager or third-party content provider can communicate with the data processing system 110 via the content provider computing device 115. In some implementations, the content placement manager or third-party content provider can communicate with the data processing system 110 via a user interface displayed on the user interface devices of the content provider computing device 115.

The data processing system 110 can include at least one server. For instance, the data processing system 110 can include a plurality of servers located in at least one data center or server farm. In some implementations, the data processing system 110 can include a third-party content placement system, e.g., a content server. The data processing system 110 can include at least one content request module 130, at least one content selection module 135, at least one script provider module 140 and at least one database 145. The content request module 130, the content selection module 135 and the script provider module 140 each can include at least one processing unit, server, virtual server, circuit, engine, agent, appliance, or other logic device such as programmable logic arrays configured to communicate with the database 145 and with other computing devices (e.g., the content provider computing device 115, the content publisher computing device 120, or the client device 125) via the network 105.

The content request module 130, the content selection module 135, and the script provider module 140 can include or execute at least one computer program or at least one script. The content request module 130, the content selection module 135, and the script provider module 140 can be separate components, a single component, or part of the data processing system 110. The content request module 130, the content selection module 135, and the script provider module 140 can include combinations of software and hardware, such as one or more processors configured to execute one or more scripts.

The data processing system 110 can also include one or more content repositories or databases 145. The databases 145 can be local to the data processing system 110. In some implementations, the databases 145 can be remote to the data processing system 110 but can communicate with the data processing system 110 via the network 105. The databases 145 can include web pages, portions of webpages, third-party content items, and asynchronous click transmission script, among others, to serve to a client device 125. In some implementations, the database 145 is configured to store a content restriction list 150. The content restriction list 150 can identify applications that execute on the client device 125 that improperly present native content and that should therefore be restricted from receiving native content (e.g., as identified by the content restriction list 150). Further disclosure regarding the content restriction list 150 is presented below.

The content request module 130 can receive a request for content from the client device 125. The request for content can include a request for an information resource, a request for one or more third-party content items, a request for a script or a combination thereof. In some implementations, the request for content can include a request for third-party content. In some implementations, the request for third-party content can include an address or identifier of an information resource on which the third-party content is to be displayed. The request for third-party content can also include or identify one or more parameters that can be used by the data processing system 110 to determine the content to provide in response to the request for content. For example, the parameters can identify a size of a content slot within which to insert the requested content. The parameters can identify a type of content associated with the information resource, a type of third-party content requested (e.g., text, image, video, etc.), client device information, size information for requested third-party content item or a combination thereof.

The content selection module 135 can be configured to determine content to be transmitted to the client device 125 in response to a received request for content. The content selection module 135 can determine the content to be sent to the client device 125 based on information included in the request for content. For instance, upon receiving a request for an information resource, the content selection module 135 can use the address or identifier of the information resource in the request for content to determine the content to send to the client device. In the case of receiving a request for one or more third-party content items, the content selection module 135 can select the third-party content item(s) based on an address or identifier for the information resource on which the third-party content item is to be presented, content type information (e.g., sports, news, music, movies, travel, etc.) for the information resource, size information of the slot(s) in which the third-party content item(s) is/are to be displayed, client device information (e.g., device type, device identifier, device location, etc.). In some implementations, the content selection module 135 can access the database 145 and retrieve the content for sending to the client device 125.

In some implementations, the content selection module 135 can be configured to determine whether or not a script is to be sent to the client device 125 in response to the request for content. The content selection module 135 can determine whether or not a script is to be sent to the client device 125 based on the type of the content request (e.g., a request for native content), an information resource identifier in the request for content or a combination thereof. In some implementations, the content selection module 135 can determine whether or not a script is to be sent to the client device 125 by classifying the received content request for utilization of an interaction confirmation protocol. Upon determining that a script is to be sent to the client device 125, the content selection module 135 can forward the request for content or an indication thereof to the script provider module 140. In some implementations, the content selection module 135 can select a third-party content item to send to the client device 125 along with a script, such as the interaction confirmation script.

The script provider module 140 can be configured to retrieve an interaction confirmation script from the database 145 and transmit the retrieved script to the client device 125 (or to another entity for sending to the client device 125). In some implementations, the interaction confirmation script can be transmitted to the client device 125 separately or together with a third-party content item. For instance, the script provider module 140, the content selection module 135 or another entity of the data processing system 110 can include the interaction confirmation script into the third-party content item before sending the third-party content item to the client device 125. In some implementations, the script provider module 140, the content selection module 135 or another entity of the data processing system 110 can send the interaction confirmation script together with a requested information resource to the client device 125.

The interaction confirmation script can include computer-executable instructions. The computer-executable instructions can include a script, such as HyperText Markup Language (HTML), Extensible HyperText Markup Language (XHTML), Extensible Markup Language (XML), Cascading Style Sheets (CSS), and JavaScript, among others. The computer-executable instructions can be executed within an application of the client device 125, such as the application that caused the client device 125 to transmit the content request received by the content request module 130. The application can include, for example, an Internet browser, a mobile application, a gaming application, a GPS application, or any other computer program capable of reading and executing the computer-executable instructions.

In brief overview, the computer-executable instructions, when executed by a processor of the client device 125, can cause an application of the client device to: (a) detect, responsive to a first content item presented within the application at the client device, a first interaction event with the first content item, (b) present, upon detecting the first interaction event on the first content item, the second content item within the application, (c) detect a second interaction event with the second content item, (d) transmit, to the first server, upon detecting the second interaction event, a confirmation of the first interaction event, and (e) transmit, to a second server, a request to access an information resource linked to the second content item. Additional details relating to the interaction confirmation script are provided further herein in relation to FIGS. 2, 3, 4 and 5.

Figure 2:
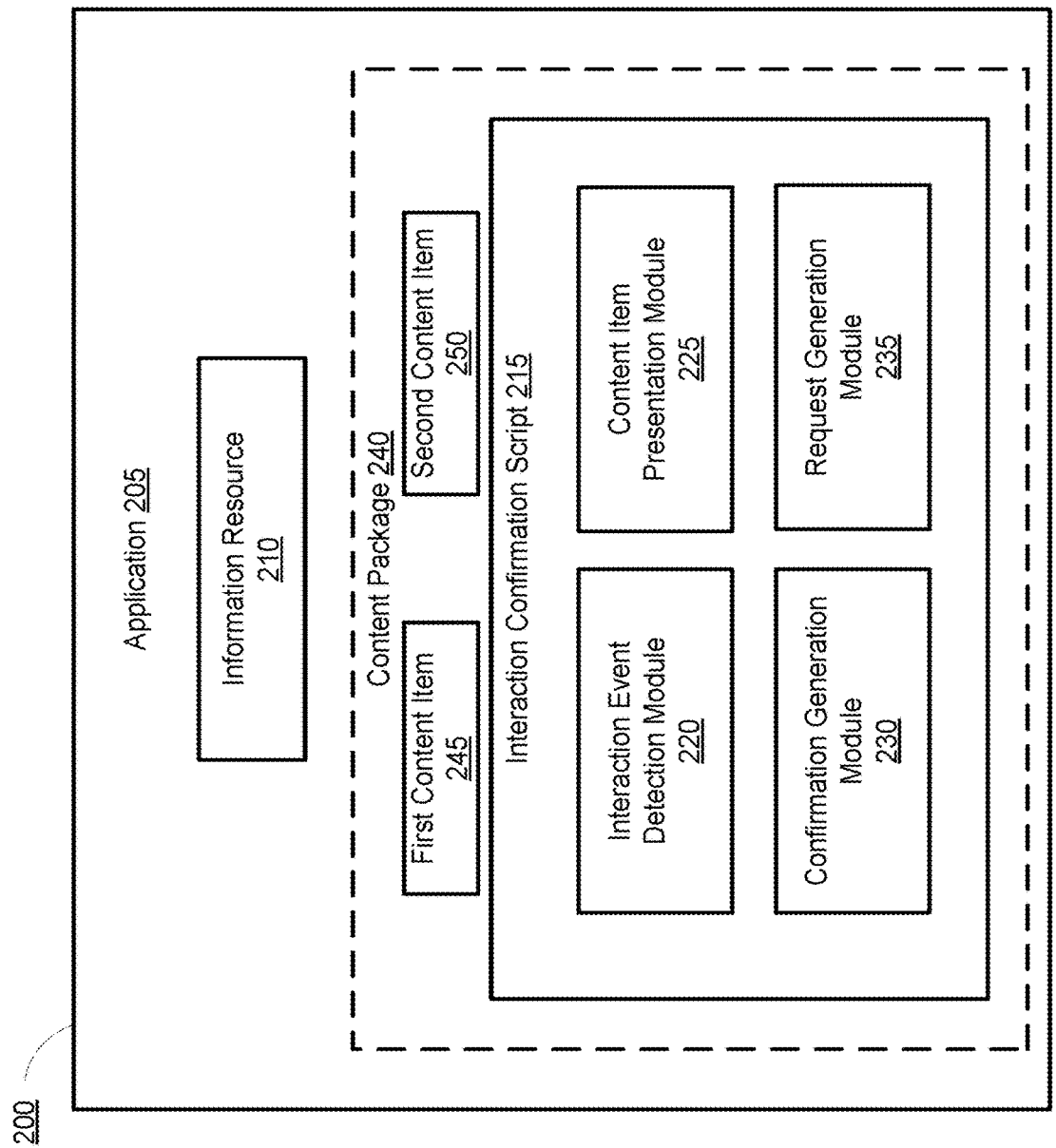
FIG. 2 is a block diagram depicting a system for detecting improper presentation of content items by applications executing on client devices according to some implementations.

FIG. 2 is a block diagram depicting a system for detecting improper presentation of content items by applications executing on client devices according to some implementations. The interaction confirmation system 200 can include an application 205, an information resource 210, an interaction event detection module 220, a content item presentation module 225, a confirmation generation module 230, and a request generation module 235. In some implementations, the interaction event detection module 220, the content item presentation module 225, the confirmation generation module 230, and the request generation module 235 can be modules within an interaction confirmation script 215. The interaction confirmation script system 200 can be run or otherwise be executed by one or more processors of a computing device, such as those described below in FIG. 6. In some implementations, any of the interaction event detection module 220, the content item presentation module 225, the confirmation generation module 230, and the request generation module 235 can be part of the application 205, information resource 210 or the interaction confirmation script 215.

In some implementations, the interaction confirmation script 215 is received by the client device 125 via the application 205 executing on the client device 125. The interaction confirmation script 215 can be sent by the data processing system 110 to the client device 125 in response to a content request sent by the client device 125 to the data processing system 110. In some implementations, the content request sent by the client device 125 includes a request for native content. In some implementations, the data processing system 110 transmits a content package 240 that includes the interaction confirmation script 215. The content package 240 can further include a first content item 245 and a second content item 250 for rendering and presentation by the application 205. In some implementations, the first content item 245 includes a native content item and the second content item 250 includes an interstitial content item.

In some implementations, the data processing system 110, in response to the content request received from the client device 125 can classify the received request as one that will trigger packaging and transmission of the interaction confirmation script 215 to the client device 125 along with a selected native content item (e.g., the first content item 245) and a similar interstitial content item (e.g., the second content item 250). Further disclosure regarding the content package 240, the first content item 245, and the second content item 250 is presented below.

The application 205 can include, for example, an Internet browser, mobile application, gaming application, GPS application, or any other computer program capable of executing or otherwise invoking computer-executable instructions, such as the computer-executable instructions included in the information resource 210, the interaction confirmation script 215, the interaction event detection module 220, the content item presentation module 225, the confirmation generation module 230, and the request generation module 235. The application 205 can obtain or receive the information resource 210 from a server hosting the information resource, such as a server of the content publisher 120, a server of the content provider 115, or a server of the data processing system 110.

Figure 3:
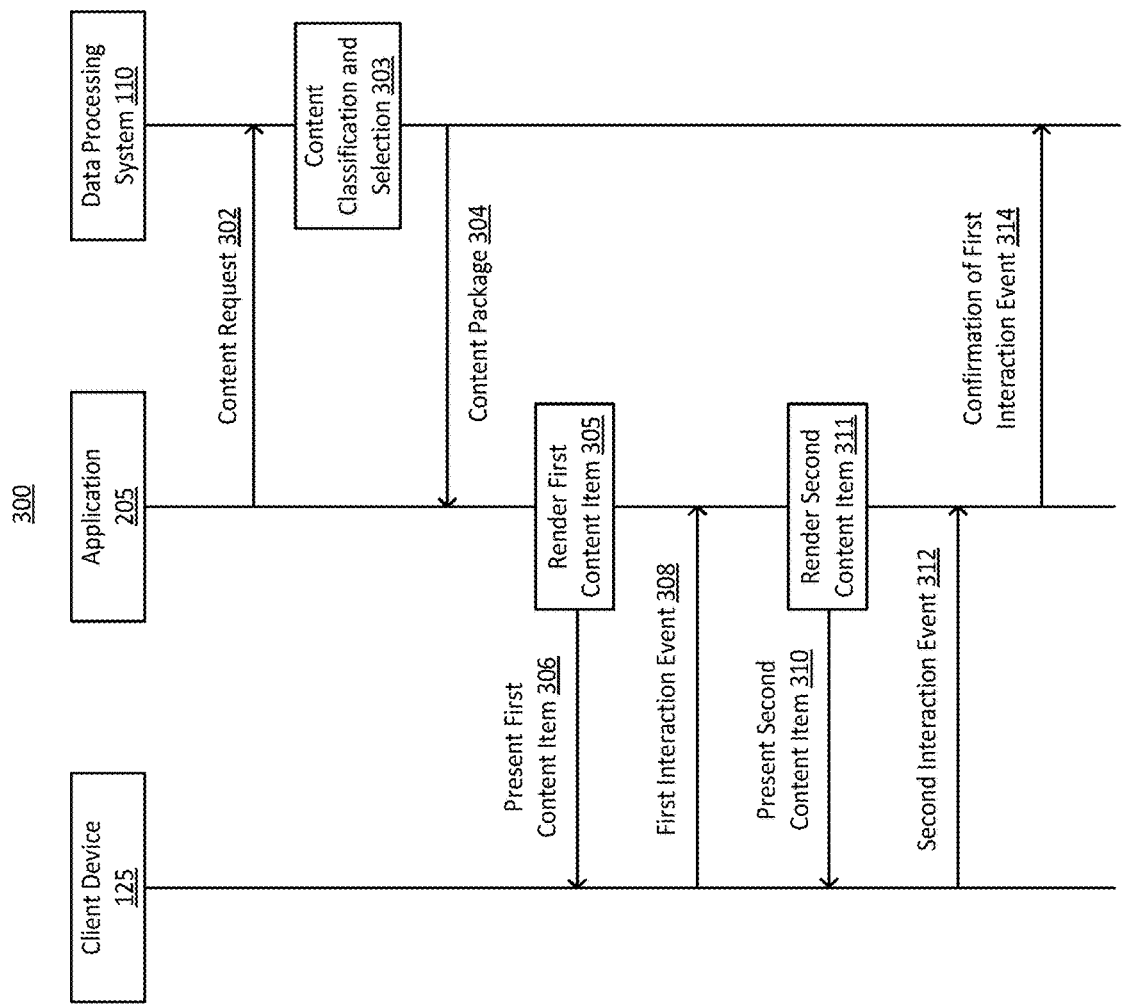
FIG. 3 is a signaling diagram illustrating communication within an environment for detecting improper presentation of content items by applications executing on client devices according to some implementations.

FIG. 3 is a signaling diagram illustrating communication within an environment for detecting improper presentation of content items by applications executing on client devices according to some implementations. Referring now to FIGS. 1-3 together, the client device 125 (e.g., via the application 205) can transmit a content request to the data processing system 110 at signal 302. In some implementations, the content request is a request for a native content item. In some implementations, a native content item can appear to have the same look and feel as content generated by the content publisher 120 within the environment of the application 205. For example, a native content item can include visual characteristics that match or substantially match the surrounding environment of the application 205 in which the native content item is to be displayed. In some implementations, the data processing system 110 sends a native content item to the client device 125 in the form of a plurality of content components that make up the native content item, and the content components are rendered at the client device 125 by the application 205. For example, the content components can include, but are not limited to, a headline, an image, a body, a call to action, a logo, an attribution, a click through URL, or the like.

In some implementations, the content selection module 135, in response to the content request module 130 receiving a content request from the client device 125, at block 303, can classify the received request as one that will trigger packaging and transmission of the interaction confirmation script 215 to the client device 125 along with a selected native content item and a similar interstitial content item. In some implementations, the content request includes an application identifier for identifying the application 205. Accordingly, the data processing system 110 can maintain (e.g., in the database 145) a list of applications that are candidate applications in which determinations are to be made as to whether native content is being properly displayed. In some implementations, the application identifiers identify the application 205 and a particular version of the identified application 205. In some implementations, the application identifiers identify a type of the application 205 (e.g., based on a type of client device 125 on which the application 205 is installed). For example, the application identifier can identify a particular operating system on which the client device 125 operates and with which the application 205 is compatible.

As such, in some implementations, the content request module 130 performs a look up in the database 125 to determine if the application identifier received in the content request (e.g., the application identifier that identifies that the request is sent from the application 205) matches one of the stored application identifiers for identifying candidate applications to trigger determining whether native content is being properly displayed.

In some implementations, once the content request module 130 identifies the application 205 as one that is to be evaluated for native content presentation performance, the content request module 130 determines whether the client device 125 that sent the content request will receive the interaction confirmation script 215 with the selected native content item. For example, also stored in the database 145 can be a predetermined percentage assigned to or otherwise associated with each of the candidate application identifiers that are stored for triggering native content presentation performance evaluation with respect to the applications identified by those candidate application identifiers. The predetermined percentage can identify a percentage of content requests that are to be classified as script requests for sending the interaction confirmation script 215 in response to the content request classified as a script request.

As an example, if an application identifier of the application 205 is assigned a predetermined percentage of 35%, then the content request module 130 can classify 35% of the content requests received from the application 205 (e.g., across a plurality of client devices 125) as script requests such that the interaction confirmation script 215 is sent to the client devices 125 that sent those content requests classified as script requests. In some implementations, the application 205 corresponds to one application instance installed on a single client device. In some implementations, the application 205 corresponds to a particular version of a particular application installed across a plurality of client devices. In some implementations, the application 205 corresponds to any version of the application 205 across a plurality of client devices 125. Accordingly, the remaining 65% of content requests can be classified as non-script requests such that the client devices 125 that sent content requests that the data processing system 110 classified as non-script content requests do not receive the interaction confirmation script 215, but do receive a requested native content item. In some implementations, the content request module 130 randomly classifies (e.g., at a rate dictated by the assigned predetermined percentage) content requests as being a script content request or a non-script content request. In some implementations, the content request module 130 classifies content requests as being a script content request based on a predetermined pattern (e.g., every fourth content request is classified as a script content request when the predetermined percentage is 25%).

In addition to sending the interaction confirmation scripts 215 in response to the content requests classified as script content requests, the content selection module 135 can select and provide a native content item (e.g., as originally requested) and an interstitial content item, such that the data processing system 110 provides a content package including the interaction confirmation script 215, the requested native content item, and an interstitial content item at signal 304. The interstitial content item can include a content item that is presented and displayed to take over a substantial portion of the display area of the application 205. For example, the interstitial content item can overlay the display of the application 205. In some implementations, the substance of the interstitial content item is substantially identical to that of the native content item included in the content package. In some implementations, the interstitial content item includes inline HTML code that is sent along with the native content item.

In some implementations, native content can be rendered by the application 205 and presented for display within an environment of the application 205 at block 305 and signal 306, respectively. In such implementations, a native content item including one or more content components is transmitted from the data processing system 110 to the client device 125, where the application 205 at the client device 125 assembles the content components of the content item according to predetermined parameters of the application 205. Once the application 205 renders the native content using the content components, the application 205 presents the rendered native content for display within the environment of the application 205 such that the rendered content appears to have the same look and feel as content generated by the content publisher 120 within the application 205. In some implementations, the content publisher 120 can establish the predetermined parameters with which the application 205 utilizes to assemble and present native content items. However, because these parameters vary from application to application and rely on individual content publishers 120 to establish, some content publishers 120 may incorrectly implement parameters such that native content items are presented at the client device 125 incorrectly, which may result in inadvertent interactions with the incorrectly presented native content items.

For example, the content publisher 120 can establish the parameters for display with respect to their application. The parameters can dictate appearance of native content components that are received from the data processing system 110. As an example, the received native content components can include elements of a native content item such as, but not limited to, a headline, an image, a body, a call to action, a logo, an attribution, a click through URL, or the like. The established parameters can dictate the appearance of the native content components such as location within a native content item, coloring, font, font size, interaction type (e.g., tap or swipe for interaction), and the like. As such, the parameters provide instructions at the application for rendering and presenting received native content components within an application. In some implementations, the content publisher 120 provides the native content parameters within the application of the content publisher 120.

However, because the content parameters are established and implemented by respective content publishers 120, there may be a wide variance in how native content components are displayed within applications. Furthermore, the content publishers 120 may improperly set their parameters such that native content components are rendered and displayed incorrectly within an application, which may result in inadvertent interactions with an improperly displayed native content item in an application by a user (e.g., when a native content item improperly overlays a separate link that a user wishes to click on). Because these native content display parameters may vary from application to application, from version to version of a same application (e.g., a 1.0 version compared to a 2.0 version), or from different types of a same application (e.g., an application configured for one operating system compared to the same application configured for another operating system), the parameters set by the content publisher 120 may similarly vary with respect to different applications, different versions of applications, and different types of applications, and native content items may therefore be displayed improperly with respect to different versions or types of a same application.

In some implementations, at signal 308, the interaction event detection module 220 executing on the client device 125 can cause the client device 125 to detect an interaction event with respect to the presented native content item within the application 205. For example, the interaction event can include a click, swipe, tap, hover-over with a cursor, or any other interaction with the presented native content item.

In some implementations, at block 311, in response to detecting the interaction event at signal 308, the content item presentation module 225 executing on the client device 125 can cause the client device 125 to render the interstitial content item received in the content package at signal 304. In some implementations, the application 205 executing on the client device 125 can cause the client device 125 to detect whether the interstitial content item corresponding to the presented native content item (e.g., including the same or similar information presented in the native content item) was received. For example, the application 205 can cause the client device 125 to detect that the content package at block 304 includes more than the requested native content item. In some implementations, the application 205 causes the client device 125 to detect that the content package includes the interstitial content item by determining whether HTML inline code representing the interstitial content item exists in the content package. In some implementations, the content package includes a flag or any other indicator to indicate that the content package includes the interstitial content item in addition to the native content item, and the application 205 can cause the client device 125 to detect the presence of the flag in the content package.

In some implementations, in response to detecting the presence of the interstitial content item in the received content package and in response to detecting the interaction event at signal 308, the content item presentation module 225 executing on the client device 125 can cause the client device 125 to render the interstitial content item received in the content package at signal 304. In some implementations, the content item presentation module 225 causes the client device 125 to parse the inline HTML code received in the content package for instructions on rendering the interstitial content item, and then renders the interstitial content item based on the instructions. Once the interstitial content item is rendered, the content item presentation module 225 can cause the client device 125 to present the interstitial content item within the application 205. For example, the interstitial content item can be presented in the information resource 210 (e.g., by taking a substantial portion of the space in the information resource 210).

In some implementations, at signal 312, the confirmation generation module 230 executing on the client device 125 can cause the client device 125 to detect an interaction event with respect to the presented interstitial content item within the application 205. For example, the interaction event can include a click, swipe, tap, hover-over with a cursor, or any other interaction with the presented interstitial content item. In response to detecting the interaction event with respect to the interstitial content item, the confirmation generation module 230 can cause the client device 125 to send a confirmation of the interaction event with respect to the native content item to the data processing system 110.

In some implementations, the data processing system 110 receives the confirmation of the interaction event with respect to the native content item and can implement performance evaluations based on received confirmations of the native content interaction events across a plurality of client devices 125. For example, as described above, the data processing system 110 can select a predetermined percentage of client devices 125 requesting native content items via the application 205 to be client devices 125 that receive the content package including the native content item, the interstitial content item, and the interaction confirmation script (e.g., a content package subset of the total client devices 125 making the native content item request from the application 205), while the remaining percentage of the client devices 125 are to receive the native content item without the interstitial content item and without the interaction confirmation script (e.g., a non-content package subset of the total client devices 125 making the native content item request from the application 205). Accordingly, in some implementations, the data processing system 110 compares and analyzes performance metrics of the content package subset and the non-content package subset in determining whether the content publisher 120 correctly renders and displays native content items (e.g., whether the first interaction event with respect to the native content item at signal 308 was purposeful or accidental due to improper presentation of the native content item).

In some implementations, the data processing system 110 determines a performance metric with respect to the content package subset of the total client devices 125 that made a native content item request from the application 205. For example, the performance metric can include a percentage or ratio representing a number of confirmations received (e.g., at signal 314) by the data processing system 110 compared to the number of client devices 125 that were sent the content package (e.g., at signal 304). Accordingly, the performance metric of the content package subset can represent a percentage of users that purposefully interacted with the native content item with respect to the number of individual content packages sent to the content package subset of the total client devices 125 that made a native content item request from the application 205. Similarly, in some implementations, the data processing system 110 determines a performance metric with respect to the non-content package subset of the total client devices 125 that made a native content item request from the application 205. For example, the performance metric can include a percentage or ratio representing a number of indications of interaction events with respect to the native content item received by the data processing system 110 compared to the number of client devices 125 that were sent the requested native content item. Accordingly, the performance metric of the non-content package subset can represent a percentage of users that interacted with the native content item (e.g., both purposefully and accidentally) with respect to the number of individual native content items sent to the non-content package subset of the total client devices 125 that made a native content item request from the application 205.

In some implementations, the data processing system compares the performance metric of the content package subset to the performance metric of the non-content package subset in determining whether the native content item is improperly displayed in the application 205. For example, the data processing system 110 can compare a difference between the performance metric of the content package subset and the performance metric of the non-content package subset to a predetermined threshold. In some implementations, if the difference between the two performance metrics exceeds the predetermined threshold then the data processing system 110 identifies the application 205 as improperly displaying native content items. As an example, the data processing system 110 can identify the application 205 (e.g., a particular version of the application 205, the application 205 across multiple versions, this particular instance of the application 205, etc.) as improperly displaying native content when the performance metric of the non-content package subset is greater than the performance metric of the content package subset by at least a predetermined threshold. In some implementations, the predetermined threshold is input at the data processing system 110 and stored in the database 145 and can be any suitable value for determining what difference between the performance metrics (e.g., represented as percentages) determines that the application 205 improperly displays native content items (e.g., a value of the predetermined threshold can be 5%, 10%, 15%, and so on).

In some implementations, the data processing system 110 determines that the application 205 improperly displays native content items based on the performance metric of the content package subset, but not on the performance metric of the non-content package subset. The data processing system 110 can compare the performance metric of the content package subset itself with a predetermined threshold and make a determination based on the comparison. For example, the performance metric includes a percentage or ratio representing a number of confirmations received by the data processing system 110 compared to the number of client devices 125 that were sent the content package, the data processing system 110 can compare the percentage performance metric with a threshold percentage, and if the performance metric is below the threshold percentage the data processing system 110 can identify the application 205 as improperly displaying native content.

In some implementations, in response to identifying the application 205 as improperly displaying native content, the data processing system 110 can perform one or more restrictive procedures with respect to the application 205. For example, the data processing system 110 can add the application 205 to the content restriction list 150. The content restriction list 150 can be stored in the database 145 and can include the application identifier identifying the application 205 such that the data processing system 110 can cross-reference the list when incoming subsequent content requests including the application identifier of the application 205 are received by the data processing system 110. If the data processing system 110 matches an application identifier of a requesting application with an application identifier on the content restriction list 150, the data processing system 110 can restrict itself from transmitting a native content item in response to the request (e.g., until the native content item display performance is fixed at the application 205 by the content publisher 120). In some implementations, the data processing system 110 receives an alert from the content publisher 120 of the application 205 indicating that the improper presentation of native content has been remedied (e.g., in response to a corresponding alert sent to the content publisher 120 indicating that their application 205 improperly displays native content). In addition to the application 205 sending the confirmation of the interaction event of the native content item, in some implementations, and in response to detecting the interaction event at signal 312, the request generation module 235 executing on the client device 125 can cause the client device 125 to transmit a request to access an information resource linked by the interstitial content item. The request can be sent to a server of the content provider 115 that provided the native content item and the interstitial content item displayed in the application 205.

Figure 4:
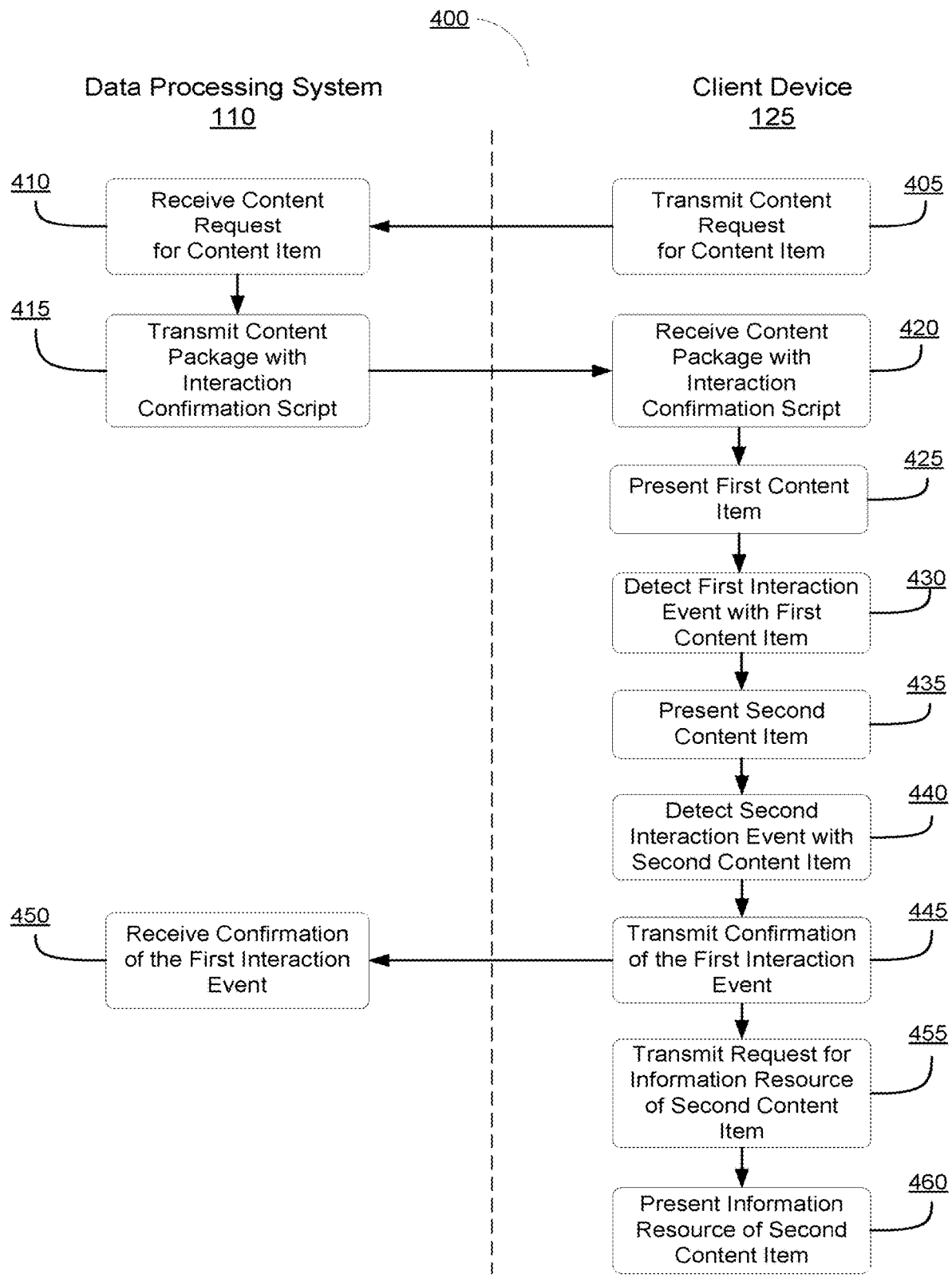
FIG. 4 is a flow diagram depicting a method for detecting inadvertent interactions with native content items according to some implementations.

FIG. 4 is a flow diagram 400 depicting a method for detecting improper presentation of content items by applications executing on client devices according to some implementations.

In some implementations, the method 400 includes the client device 125 transmitting a content request for a content item (block 405), and the data processing system 110 receiving the content request for a content item (block 410). The method 400 further includes the data processing system 110 transmitting a content package including an interaction confirmation script (block 415), and the client device 125 receiving the content package including the interaction confirmation script (block 420). The method 400 further includes the client device 125 presenting the first content item (block 425). The method 400 further includes the client device 125 detecting a first interaction event with the presented first content item (block 430). The method 400 further includes the client device 125 presenting a second content item (block 435). The method 400 further includes the client device 125 detecting a second interaction event with the presented second content item (block 440). The method 400 further includes the client device 125 transmitting a confirmation of the first interaction event (block 445). The method 400 further includes the data processing system 110 receiving the confirmation of the first interaction event (block 450). The method 400 further includes the client device 125 transmitting a request for an information resource of the second content item (block 455). The method 400 further includes the client device 125 presenting the information resource of the second content item (block 460).

In particular, in some implementations, the method 400 includes the client device 125 transmitting a content request for a content item (block 405), and the data processing system 110 receiving the content request for a content item (block 410). The client device 125 can transmit a content request to the data processing system 110. In some implementations, the content request is a request for a native content item. In some implementations, a native content item can appear to have the same look and feel as content generated by the content publisher 120 within the environment of the application. For example, a native content item can include visual characteristics that match or substantially match the surrounding environment of the application in which the native content item is to be displayed. In some implementations, the data processing system 110 sends a native content item to the client device 125 in the form of a plurality of content components that make up the native content item, and the content components are rendered at the client device 125 by the application. For example, the content components can include, but are not limited to, a headline, an image, a body, a call to action, a logo, an attribution, a click through URL, or the like.

In addition to sending the interaction confirmation scripts 215 in response to the content requests classified as script content requests, the content selection module 135 can select and provide a native content item (e.g., as originally requested) and an interstitial content item, such that the data processing system 110 provides a content package including the interaction confirmation script 215, the requested native content item, and an interstitial content item at signal 304. The interstitial content item can include a content item that is presented and displayed to take over a substantial portion of the display area of the application 205. For example, the interstitial content item can overlay the display of the application 205. In some implementations, the substance of the interstitial content item is substantially identical to that of the native content item included in the content package. In some implementations, the interstitial content item includes inline HTML code that is sent along with the native content item.

The method 400 further includes the data processing system 110 transmitting a content package including an interaction confirmation script (block 415), and the client device 125 receiving the content package including the interaction confirmation script (block 420). In addition to sending the interaction confirmation scripts in response to the content request, the data processing system 110 can select and provide a native content item (e.g., as originally requested) and an interstitial content item, such that the data processing system 110 provides a content package including the interaction confirmation script, the requested native content item, and an interstitial content item. The interstitial content item can include a content item that is presented and displayed to take over a substantial portion of the display area of the application. For example, the interstitial content item can overlay the display of the application. In some implementations, the substance of the interstitial content item is substantially identical to that of the native content item included in the content package. In some implementations, the interstitial content item includes inline HTML code that is sent along with the native content item.

The method 400 further includes the client device 125 presenting the first content item (block 425). In some implementations, native content can be rendered by the application and presented for display within an environment of the application. In such implementations, a native content item including one or more content components is transmitted from the data processing system 110 to the client device 125, where the application at the client device 125 assembles the content components of the content item according to predetermined parameters of the application. Once the application renders the native content using the content components, the application presents the rendered native content for display within the environment of the application such that the rendered content appears to have the same look and feel as content generated by the content publisher 120 within the application. In some implementations, the content publisher 120 can establish the predetermined parameters with which the application utilizes as instructions for how to assemble and present native content items. However, because these parameters vary from application to application and rely on individual content publishers 120 to establish, some content publishers 120 may incorrectly implement parameters such that native content items are presented at the client device 125 incorrectly, which may result in inadvertent interactions with the incorrectly presented native content items.

For example, the content publisher 120 can establish the parameters for display with respect to their application. The parameters can dictate appearance of native content components that are received from the data processing system 110. As an example, the received native content components can include elements of a native content item such as, but not limited to, a headline, an image, a body, a call to action, a logo, an attribution, a click through URL, or the like. The established parameters can dictate the appearance of the native content components such as location within a native content item, coloring, font, font size, interaction type (e.g., tap or swipe for interaction), and the like. As such, the parameters provide instructions at the application for rendering and presenting received native content components within an application. In some implementations, the content publisher 120 provides the native content parameters within the application of the content publisher 120.

However, because the content parameters are established and implemented by respective content publishers 120, there may be a wide variance in how native content components are displayed within applications. Furthermore, the content publishers 120 may improperly set their parameters such that native content components are rendered and displayed incorrectly within an application, which may result in inadvertent interactions with an improperly displayed native content item in an application by a user (e.g., when a native content item improperly overlays a separate link that a user wishes to click on). Because these native content display parameters may vary from application to application, from version to version of a same application (e.g., a 1.0 version compared to a 2.0 version), or from different types of a same application (e.g., an application configured for one operating system compared to the same application configured for another operating system), the parameters set by the content publisher 120 may similarly vary with respect to different applications, different versions of applications, and different types of applications, and native content items may therefore be displayed improperly with respect to different versions or types of a same application.

The method 400 further includes the client device 125 detecting a first interaction event with the presented first content item (block 430). In some implementations, the client device 125 detects an interaction event with respect to the presented native content item within the application. For example, the interaction event can include a click, swipe, tap, hover-over with a cursor, or any other interaction with the presented native content item.

The method 400 further includes the client device 125 presenting a second content item (block 435). In some implementations, in response to detecting the interaction event, the client device 125 renders the interstitial content item received in the content package. In some implementations, the application executing on the client device 125 can cause the client device 125 to detect whether the interstitial content item corresponding to the presented native content item (e.g., including the same or similar information presented in the native content item) was received. For example, the application can cause the client device 125 to detect that the content package includes more than the requested native content item. In some implementations, the application causes the client device 125 to detect that the content package includes the interstitial content item by determining whether HTML inline code representing the interstitial content item exists in the content package. In some implementations, the content package includes a flag or any other indicator to indicate that the content package includes the interstitial content item in addition to the native content item, and the application can cause the client device 125 to detect the presence of the flag in the content package.

In some implementations, in response to detecting the presence of the interstitial content item in the received content package and in response to detecting the interaction event, the application executing on the client device 125 can cause the client device 125 to render the interstitial content item received in the content package. In some implementations, the application causes the client device 125 to parse the inline HTML code received in the content package for instructions on rendering the interstitial content item, and then renders the interstitial content item based on the instructions. Once the interstitial content item is rendered, the application can cause the client device 125 to present the interstitial content item within the application.

The method 400 further includes the client device 125 detecting a second interaction event with the presented second content item (block 440). In some implementations, the application executing on the client device 125 can cause the client device 125 to detect an interaction event with respect to the presented interstitial content item within the application 205. For example, the interaction event can include a click, swipe, tap, hover-over with a cursor, or any other interaction with the presented interstitial content item.

The method 400 further includes the client device 125 transmitting a confirmation of the first interaction event (block 445). The method 400 further includes the data processing system 110 receiving the confirmation of the first interaction event (block 450). In response to detecting the interaction event with respect to the interstitial content item, the application can cause the client device 125 to send a confirmation of the interaction event with respect to the native content item to the data processing system 110.

The method 400 further includes the client device 125 transmitting a request for an information resource of the second content item (block 455). The method 400 further includes the client device 125 presenting the information resource of the second content item (block 460). The request can be sent to a server of the content provider 115 that provided the native content item and the interstitial content item displayed in the application 205.

Figure 5:
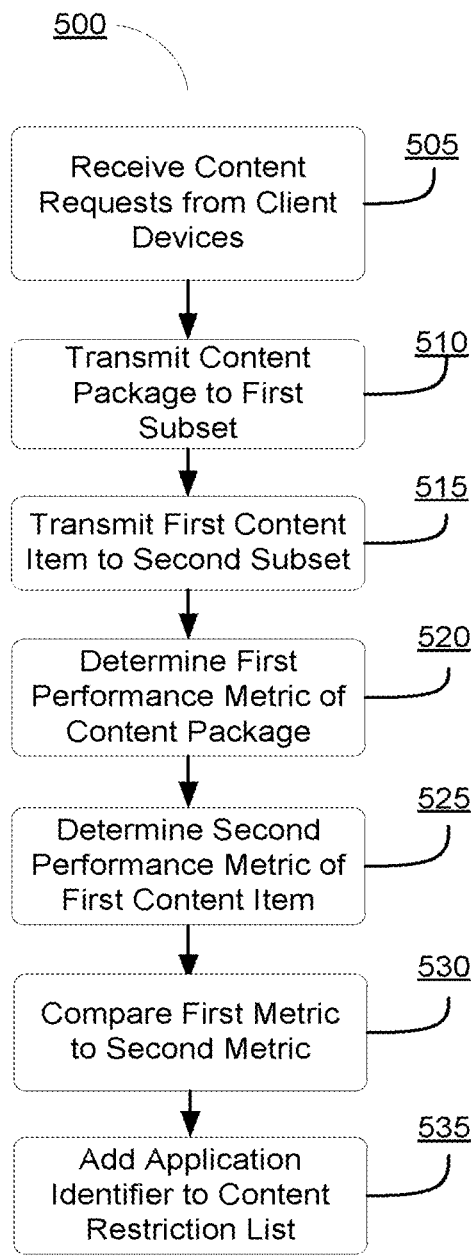
FIG. 5 is a flow diagram depicting a method for detecting improper presentation of content items by a data processing system in communication with the applications executing on the client devices described with respect to FIG. 4 according to some implementations.

FIG. 5 is a flow diagram depicting a method 500 for detecting improper presentation of content items by a data processing system in communication with the applications executing on the client devices described with respect to FIG. 4 according to some implementations. In some implementations, the method 500 includes the data processing system 110 receiving a plurality of content requests from a plurality of client devices (block 505). The method 500 further includes the data processing system 110 transmitting a content package to a first subset of the plurality of client devices (block 510). The method 500 further includes the data processing system 110 transmitting a first content item to a second subset of the plurality of client devices (block 515). The method 500 further includes the data processing system 110 determining a first performance metric with respect to the transmitted content package (block 520). The method 500 further includes the data processing system 110 determining a second performance metric with respect to the first content item (block 525). The method 500 further includes the data processing system 110 comparing the first performance metric to the second performance metric (block 530). The method 500 further includes adding an application identifier to a content restriction list based on the comparison (block 535).

In particular, in some implementations, the method 500 includes the data processing system 110 receiving a plurality of content requests from a plurality of client devices (block 505). In some implementations, in response to receiving content requests from client devices, the data processing system 110 can classify the received requests as those that will trigger packaging and transmission of the interaction confirmation script along with a selected native content item and a similar interstitial content item. In some implementations, a content request includes an application identifier for identifying an application. Accordingly, the data processing system 110 can maintain a list of applications that are candidate applications in which determinations are to be made as to whether native content is being properly displayed. In some implementations, the application identifiers identify the application and a particular version of the identified application. In some implementations, the application identifiers identify a type of the application (e.g., based on a type of client device on which the application is installed). For example, the application identifier can identify a particular operating system on which the client device operates and with which the application is compatible.

As such, in some implementations, the data processing system 110 performs a look up in the database to determine if the application identifier received in the content request (e.g., the application identifier that identifies that the request is sent from the application) matches one of the stored application identifiers for identifying candidate applications to trigger determining whether native content is being properly displayed.

The method 500 further includes the data processing system 110 transmitting a content package to a first subset of the plurality of client devices (block 510). The method 500 further includes the data processing system 110 transmitting a first content item to a second subset of the plurality of client devices (block 515). In some implementations, once the data processing system 110 identifies the application as one that is to be evaluated for native content presentation performance, the data processing system 110 determines whether the client device that sent the content request will receive the interaction confirmation script with the selected native content item. For example, also stored in the database can be a predetermined percentage assigned to or otherwise associated with each of the candidate application identifiers that are stored for triggering native content presentation performance evaluation with respect to the applications identified by those candidate application identifiers. The predetermined percentage can identify a percentage of content requests that are to be classified as script requests for sending the interaction confirmation script in response to the content request classified as a script request.

As an example, if an application identifier of the application is assigned a predetermined percentage of 35%, then the data processing system 110 can classify 35% of the content requests received from the application (e.g., across a plurality of client devices) as script requests such that the interaction confirmation script is sent to the client devices that sent those content requests classified as script requests. In some implementations, the application corresponds to one application instance installed on a single client device. In some implementations, the application corresponds to a particular version of a particular application installed across a plurality of client devices. In some implementations, the application corresponds to any version of the application across a plurality of client devices. Accordingly, the remaining 65% of content requests can be classified as non-script requests such that the client devices that sent content requests that the data processing system 110 classified as non-script content requests do not receive the interaction confirmation script 215, but do receive a requested native content item. In some implementations, the data processing system 110 randomly classifies (e.g., at a rate dictated by the assigned predetermined percentage) content requests as being a script content request or a non-script content request. In some implementations, the data processing system 110 classifies content requests as being a script content request based on a predetermined pattern (e.g., every fourth content request is classified as a script content request when the predetermined percentage is 25%).

In addition to sending the interaction confirmation scripts in response to the content requests classified as script content requests, the data processing system 110 can select and provide a native content item (e.g., as originally requested) and an interstitial content item, such that the data processing system 110 provides the content package including the interaction confirmation script 215, the requested native content item, and an interstitial content item. The interstitial content item can include a content item that is presented and displayed to take over a substantial portion of the display area of the application. For example, the interstitial content item can overlay the display of the application. In some implementations, the substance of the interstitial content item is substantially identical to that of the native content item included in the content package. In some implementations, the interstitial content item includes inline HTML code that is sent along with the native content item.

The method 500 further includes the data processing system 110 determining a first performance metric with respect to the transmitted content package (block 520). In some implementations, the data processing system 110 receives confirmation of the interaction event with respect to the native content item and can implement performance evaluations based on received confirmations of the native content interaction events across a plurality of client devices. For example, as described above, the data processing system 110 can select a predetermined percentage of client devices requesting native content items via the application to be client devices that receive the content package including the native content item, the interstitial content item, and the interaction confirmation script (e.g., a content package subset of the total client devices making the native content item request from the application), while the remaining percentage of the client devices are to receive the native content item without the interstitial content item and without the interaction confirmation script (e.g., a non-content package subset of the total client devices making the native content item request from the application). Accordingly, in some implementations, the data processing system 110 compares and analyzes performance metrics of the content package subset and the non-content package subset in determining whether the content publisher correctly renders and displays native content items (e.g., whether the first interaction event with respect to the native content item at signal 308 was purposeful or accidental due to improper presentation of the native content item).

In some implementations, the data processing system 110 determines a performance metric with respect to the content package subset of the total client devices that made a native content item request from the application. For example, the performance metric can include a percentage or ratio representing a number of confirmations received by the data processing system 110 compared to the number of client devices that were sent the content package. Accordingly, the performance metric of the content package subset can represent a percentage of users that purposefully interacted with the native content item with respect to the number of individual content packages sent to the content package subset of the total client devices that made a native content item request from the application.

The method 500 further includes the data processing system 110 determining a second performance metric with respect to the first content item (block 525). Similarly, in some implementations, the data processing system 110 determines a performance metric with respect to the non-content package subset of the total client devices that made a native content item request from the application. For example, the performance metric can include a percentage or ratio representing a number of indications of interaction events with respect to the native content item received by the data processing system 110 compared to the number of client devices that were sent the requested native content item. Accordingly, the performance metric of the non-content package subset can represent a percentage of users that interacted with the native content item (e.g., both purposefully and accidentally) with respect to the number of individual native content items sent to the non-content package subset of the total client devices that made a native content item request from the application.

The method 500 further includes the data processing system 110 comparing the first performance metric to the second performance metric (block 530). In some implementations, the data processing system 110 compares the performance metric of the content package subset to the performance metric of the non-content package subset in determining whether the native content item is improperly displayed in the application. For example, the data processing system 110 can compare a difference between the performance metric of the content package subset and the performance metric of the non-content package subset to a predetermined threshold. In some implementations, if the difference between the two performance metrics exceeds the predetermined threshold then the data processing system 110 identifies the application as improperly displaying native content items. As an example, the data processing system 110 can identify the application (e.g., a particular version of the application, the application across multiple versions, this particular instance of the application 205, etc.) as improperly displaying native content when the performance metric of the non-content package subset is greater than the performance metric of the content package subset by at least a predetermined threshold. In some implementations, the predetermined threshold is input at the data processing system 110 and stored in the database and can be any suitable value for determining what difference between the performance metrics (e.g., represented as percentages) determines that the application improperly displays native content items (e.g., a value of the predetermined threshold can be 5%, 10%, 15%, and so on).

In some implementations, the data processing system 110 determines that the application 205 improperly displays native content items based on the performance metric of the content package subset, but not on the performance metric of the non-content package subset. The data processing system 110 can compare the performance metric of the content package subset itself with a predetermined threshold and make a determination based on the comparison. For example, the performance metric includes a percentage or ratio representing a number of confirmations received by the data processing system 110 compared to the number of client devices 125 that were sent the content package, the data processing system 110 can compare the percentage performance metric with a threshold percentage, and if the performance metric is below the threshold percentage the data processing system 110 can identify the application as improperly displaying native content.

The method 500 further includes the data processing system 110 adding an application identifier to a content restriction list based on the comparison (block 535). In some implementations, in response to identifying the application as improperly displaying native content, the data processing system 110 can perform one or more restrictive procedures with respect to the application. For example, the data processing system 110 can add the application to the content restriction list. The content restriction list can be stored in the database and can include the application identifier identifying the application such that the data processing system 110 can cross-reference the list when incoming subsequent content requests including the application identifier of the application are received by the data processing system 110. If the data processing system 110 matches an application identifier of a requesting application with an application identifier on the content restriction list, the data processing system 110 can restrict itself from transmitting a native content item in response to the request (e.g., until the native content item display performance is fixed at the application by the content publisher 120). In some implementations, the data processing system 110 receives an alert from the content publisher of the application indicating that the improper presentation of native content has been remedied (e.g., in response to a corresponding alert sent to the content publisher indicating that their application improperly displays native content).

Figure 6:
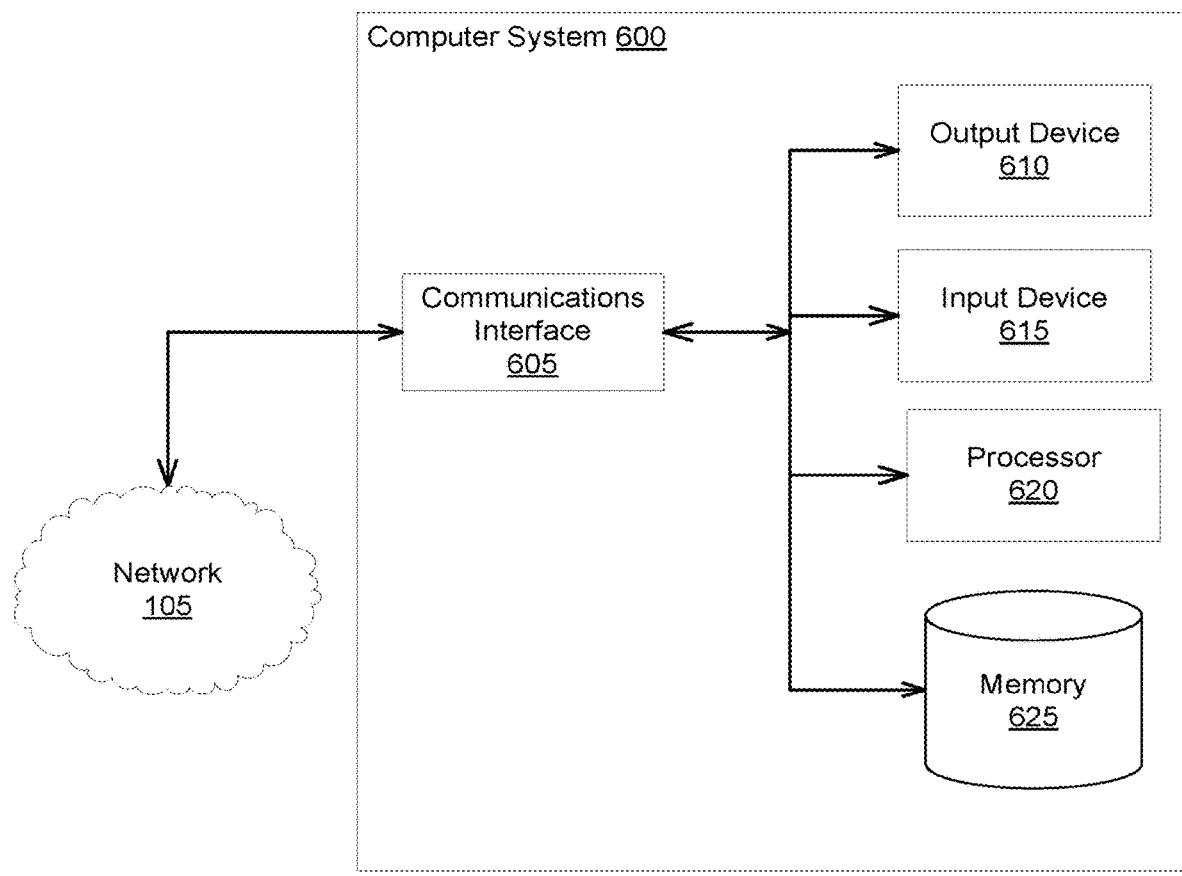
FIG. 6 is a block diagram depicting a general architecture for a computer system that may be employed to implement elements of the systems and methods described and illustrated herein according to some implementations.

FIG. 6 is a block diagram depicting a general architecture for a computer system 600 that may be employed to implement elements of the systems and methods described and illustrated herein (including the system 110 and its components such as the content request module 130, the content selection module 135, and the script provider module 140) according to some implementations. The computer system 600 can be used to provide information via the network 105 for display. The computer system 600 of FIG. 6 includes one or more processors 620 communicatively coupled to memory 625, one or more communications interfaces 605, and one or more output devices 610 (e.g., one or more display units) and one or more input devices 615. The processors 620 can be included in the data processing system 110 or the other components of the system 110 such as the content request module 130 and the content selection module 135.

In the computer system 600 of FIG. 6, the memory 625 may include any computer-readable storage media, and may store computer instructions such as processor-executable instructions for implementing the various functionalities described herein for respective systems, as well as any data relating thereto, generated thereby, or received via the communications interface(s) or input device(s) (if present). Referring again to the system 110 of FIG. 1, the data processing system 110 can include the memory 625 to store information related to the availability of inventory of one or more content units, reservations of one or more content units, among others. The memory 625 can include the database 145. The processor(s) 620 shown in FIG. 6 may be used to execute instructions stored in the memory 625 and, in so doing, also may read from or write to the memory various information processed and or generated pursuant to execution of the instructions.

The processor 620 of the computer system 600 shown in FIG. 6 also may be communicatively coupled to or control the communications interface(s) 605 to transmit or receive various information pursuant to execution of instructions. For example, the communications interface(s) 605 may be coupled to a wired or wireless network, bus, or other communication means and may therefore allow the computer system 600 to transmit information to or receive information from other devices (e.g., other computer systems). While not shown explicitly in the system of FIG. 1, one or more communications interfaces facilitate information flow between the components of the system 600. In some implementations, the communications interface(s) may be configured (e.g., via various hardware components or software components) to provide a website as an access portal to at least some aspects of the computer system 600. Examples of communications interfaces 605 include user interfaces (e.g., web pages), through which the user can communicate with the data processing system 110.

The output devices 610 of the computer system 600 shown in FIG. 6 may be provided, for example, to allow various information to be viewed or otherwise perceived in connection with execution of the instructions. The input device(s) 615 may be provided, for example, to allow a user to make manual adjustments, make selections, enter data, or interact in any of a variety of manners with the processor during execution of the instructions. Additional information relating to a general computer system architecture that may be employed for various systems discussed herein is provided further herein.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can include a source or destination of computer program instructions encoded in an artificially-generated propagated signal. The computer storage medium can also be, or be included in, one or more separate physical components or media (e.g., multiple CDs, disks, or other storage devices).

The features disclosed herein may be implemented on a smart television module (or connected television module, hybrid television module, etc.), which may include a processing module configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

The operations described in this specification can be implemented as operations performed by a data processing apparatus on data stored on one or more computer-readable storage devices or received from other sources.

The terms "data processing apparatus", "data processing system", "user device" or "computing device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The content request module 130 and the content selection module 135 can include or share one or more data processing apparatuses, computing devices, or processors.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can include any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system such as system 600 or system 110 can include clients and servers. For example, the data processing system 110 can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of the present disclosure or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the content request module 130 and the content selection module 135 can be part of the data processing system 110, a single module, a logic device having one or more processing modules, one or more servers, or part of a search engine.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed only in connection with one implementation are not intended to be excluded from a similar role in other implementations or implementations.

In implementations of the present disclosure, the content or content items may be any suitable content. In some applications the content or content items may be advertisements ("ads"), but the present disclosure is not limited to this. When the content or content items are advertisements, the content server 205 may be an ad server and/or the third party content provider may be an advertiser.

In some implementations, the request for third-party content can also include a minimum revenue amount (or minimum bid value) for displaying a third-party content item on the information resource. In some implementations, the content selection module 135 can communicate with an auction system, for example an advertising auction system, and provide the auction system information included in the request for third-party content received from the client device. The content selection module 135 can also receive one or more third-party content items from the auction system responsive to providing the information included in the request for third-party content.

In some implementations, the data processing system 110 can include an auction system, for example an advertising auction system, configured to host auctions. In some implementations, the data processing system 110 does not include the auction system but is configured to communicate with the auction system via the network 105.

In some implementations, a landing page may include additional product information of a product that is advertised in the content item. A conversion relating to the content item can occur at the landing page, e.g., a user can purchase the product or service advertised by the content item via the landing page. A conversion can happen when a user clicks on a content item and then takes an action, such as a purchase, a sign-up, a registration, etc. via the landing page.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided herein relate to controlling the display of content of information resources, the systems and methods described herein can include applied to other environments. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

The invention claimed is:

1. A method for detecting improper implementation of presentation of content items in applications executing on client devices, comprising:
   receiving, by a data processing system including one or more processors, content requests from a plurality of client devices, wherein each of the content requests is generated by an application executing on a respective client device of the plurality of client devices;
   transmitting, by the data processing system, to each client device of a first subset of the plurality of client devices, responsive to a content request from the client device, a content package including at least a content item and an interaction confirmation script;
   transmitting, by the data processing system, to each client device of a second subset of the plurality of client devices, responsive to a content request from the client device, the content item;
   determining, by the data processing system, a first performance metric of the content package;
   determining, by the data processing system, a second performance metric of the content item; and
   determining, by the data processing system, whether the application receives inadvertent clicks at the content item based on at least one of the first performance metric or the second performance metric.

2. The method of claim 1, wherein determining the first performance metric is based on confirmations received from the first subset of the plurality of client devices; and
   determining the second performance metric is based on confirmations received from the second subset of the plurality of client devices.

3. The method of claim 2, wherein the first performance metric includes a ratio representing a number of confirmations received from the first subset of the plurality of client devices compared to a number of client devices in the first subset of the plurality of client devices.

4. The method of claim 2, wherein the second performance metric includes a ratio representing a number of confirmations received from the second subset of the plurality of client devices compared to a number of client devices in the second subset of the plurality of client devices.

5. The method of claim 1, wherein the application receives inadvertent clicks at the content item, further comprising:

adding, based on the comparison, an application identifier of the application to a content restriction list to restrict selection of the content item for transmission responsive to a subsequent content request identifying the application.

6. The method of claim 5, wherein the application identifier is associated with a predetermined percentage and the predetermined percentage identifies a percentage of content requests that are to be classified as script requests for sending the interaction confirmation script.

7. The method of claim 1, wherein determining whether the application receives inadvertent clicks at the content item includes comparing the first performance metric to the second performance metric.

8. The method of claim 7, wherein determining whether the application receives inadvertent clicks further includes:

when a difference between the first performance metric and the second performance metric is above a predetermined threshold, determining that the application receives inadvertent clicks at the content item, the difference based on the comparing.

9. A system for detecting improper implementation of presentation of content items in applications executing on client devices, comprising:

a processor; and a memory coupled to the processor, the memory storing computer-executable instructions that, when executed by the processor, cause the processor to:

receive content requests from a plurality of client devices, wherein each of the content requests is generated by an application executing on a respective client device of the plurality of client devices;

transmit, to each client device of a first subset of the plurality of client devices, responsive to a content request from the client device, a content package including at least a content item and an interaction confirmation script;

transmit, to each client device of a second subset of the plurality of client devices, responsive to a content request from the client device, the content item;

determine a first performance metric of the content package;

determine a second performance metric of the content item; and determine whether the application receives inadvertent clicks at the content item based on at least one of the first performance metric or the second performance metric.

10. The system of claim 9, wherein determining the first performance metric is based on confirmations received from the first subset of the plurality of client devices; and determining the second performance metric is based on confirmations received from the second subset of the plurality of client devices.

11. The system of claim 10, wherein the first performance metric includes a ratio representing a number of confirmations received from the first subset of the plurality of client devices compared to a number of client devices in the first subset of the plurality of client devices.

12. The system of claim 10, wherein the second performance metric includes a ratio representing a number of confirmations received from the second subset of the plurality of client devices compared to a number of client devices in the second subset of the plurality of client devices.

13. The system of claim 9, wherein the application receives inadvertent clicks at the content item and wherein the memory stores further computer-executable instructions that, when executed by the processor, cause the processor to:

add, based on the comparison, an application identifier of the application to a content restriction list to restrict selection of the content item for transmission responsive to a subsequent content request identifying the application.

14. The system of claim 13, wherein the application identifier is associated with a predetermined percentage and the predetermined percentage identifies a percentage of content requests that are to be classified as script requests for sending the interaction confirmation script.

15. The system of claim 9, wherein determining whether the application receives inadvertent clicks at the content item includes comparing the first performance metric to the second performance metric.

16. The system of claim 15, wherein determining whether the application receives inadvertent clicks at the content item further includes:

when a difference, based on the comparing, between the first performance metric and the second performance metric is above a predetermined threshold, determining that the application receives inadvertent clicks at the content item.

17. A method for detecting improper implementation of presentation of content items in applications executing on client devices, comprising:

receiving, by a data processing system including one or more processors, content requests from a plurality of client devices, wherein each of the content requests is generated by an application executing on a respective client device of the plurality of client devices;

transmitting, by the data processing system, to each client device of a subset of the plurality of client devices, responsive to a content request from the client device, a content package including at least a first content item, a second content item, and an interaction confirmation script, the interaction confirmation script configured to cause the application to:

configure the first content item to be presented in a first presentation format, present the first content item in the first presentation format, display the second content item responsive to detecting a first interaction event on the first content item, and transmit, to the data processing system, a confirmation responsive to detecting a second interaction event on the second content item;

determining, by the data processing system, a performance metric of the content package; and determining, by the data processing system, whether the application receives inadvertent clicks at the first content item based on at least the performance metric.

18. The method of claim 17, wherein determining the performance metric is based on confirmations received from the subset of the plurality of client devices.

19. The method of claim 17, wherein determining whether the application receives inadvertent clicks at the first content item includes comparing the performance metric to a predetermined threshold value.

20. The method of claim 17, wherein the application receives inadvertent clicks at the first content item, further comprising:

adding, based on the comparison, an application identifier of the application to a content restriction list to restrict selection of the first content item for transmission responsive to a subsequent content request identifying the application.

\* \* \* \* \*